US005116452A

United States Patent [19]

Eder

[11] Patent Number: 5,116,452

[45] Date of Patent: May 26, 1992

[54] DEVICE FOR APPLYING LABELS TO CONTAINERS

[75] Inventor: Erich Eder, Donaustauf, Fed. Rep. of Germany

[73] Assignee: Krones AG Hermann Kronseder Maschinenfabrik, Neutraubling, Fed. Rep. of Germany

[21] Appl. No.: 714,000

[22] Filed: Jun. 5, 1991

[30] Foreign Application Priority Data

Dec. 6, 1990 [DE] Fed. Rep. of Germany ... 9016591[U]

[51] Int. Cl.[5] ............................................ B32B 31/00

[52] U.S. Cl. .................................... 156/566; 156/458; 156/567; 156/568; 156/DIG. 38

[58] Field of Search ............... 156/566, 567, 568, 525, 156/526, 575, 576, 578, DIG. 11, DIG. 13, DIG. 26, DIG. 38, 456, 457, 458, 571; 118/219, 221

[56] References Cited

U.S. PATENT DOCUMENTS

| | | | |
|---|---|---|---|
| 3,923,589 | 12/1975 | Tavernier | 156/568 |
| 4,549,454 | 10/1985 | Yamashito | 156/DIG. 11 X |
| 4,589,949 | 5/1986 | Cavagnino | 156/568 |
| 4,735,668 | 4/1988 | Hoffmann et al. | 156/568 X |
| 4,758,300 | 7/1988 | King et al. | 156/578 X |

FOREIGN PATENT DOCUMENTS 0219267 3/1990 European Pat. Off. .

*Primary Examiner*—David A. Simmons
*Assistant Examiner*—James J. Engel, Jr.
*Attorney, Agent, or Firm*—Fuller, Ryan & Hohenfeldt

[57] ABSTRACT

Apparatus for applying labels to spinning and translating containers has a rotating vacuum cylinder almost touching the containers. The printed sides of individual labels are deposited on the vacuum cylinder at which time fingers grip the leading end of the label to prevent the label from being attracted to an ensuing glue roller which has plural annular grooves and applies a strip of glue to the leading end of the label. The leading and trailing ends are also held by vacuum devices which are cam driven to extend by a small amount radially of the vacuum cylinder. The fingers register in the grooves of the roller so they do not interfere. The label on the cylinder is carried on the cylinder and secured at its trailing end by its own radially movable vacuum device. When the trailing end reaches a second glue roller the latter device moves radially outward of the cylinder to pick up a strip of glue on the trailing end. The label is then carried to a label application station where a blast of air from inside the holding device drives the leading end into tacky contact with a spinning container which causes the label to wrap around the container until the glue coated trailing end sticks to the container.

2 Claims, 3 Drawing Sheets

DEVICE FOR APPLYING LABELS TO CONTAINERS

BACKGROUND OF THE INVENTION

The invention relates to a device for applying labels to containers such as bottles and cans.

Labeling devices which use labels cut from a reel are much more economically attractive than devices which use precut labels. Such labels are often provided with a thin film of glue at their leading and trailing edges before they are transferred to the container. This method is used especially with long labels such as those which wrap fully around the container.

Such a device is known from European patent application EP-0219-267 B1. The device shown and described in this application supplies the label web to a vacuum cylinder which is equipped with several cutting knives which, in conjunction with a fixed knife located along its periphery, sever the web into individual labels. The labels are then provided with a strip of glue at the leading and trailing edges. This is accomplished with slides located in a vacuum cylinder and which travel radially in relation to the glue cylinders located along the periphery of the vacuum cylinder for the purpose of applying the glue to the leading and trailing edges of the labels. A disadvantage of this known device, which utilizes an adhesive such as hot melt glue which has a high initial tack, is that under certain operating conditions the leading edge of the label may adhere to the glue applicator roller with the result that the label is removed and drawn into the glue station. The reason for this malfunction is the small surface area of the leading edge slide which limits the amount of vacuum orifice area to the detriment of label retention. Moreover, the arrangement of the cutting knives on the vacuum cylinder is considered a disadvantage because the knives are subject to glue buildup which, in turn, causes machine down time for clean up purposes.

SUMMARY OF THE INVENTION

It is an objective of the invention to create a device that provides efficient application of labels to containers where a strip of glue is applied to the leading and trailing edges of the labels before they are wrapped around the container.

The preferred embodiment of the invention provides for feeding a continuous web of label material from a roll in synchronism with the labeling device and with the printed side of the label positioned properly. The cutting mechanism is comprised of one fixed and one rotating knife. This cutting mechanism is positioned immediately before the vacuum transfer cylinder which transports the previously cut labels past two glue rollers and a transfer station where the label is applied to a container. The vacuum cylinder which transfers the cut labels, when viewed in the direction of rotation, comprises a mechanically controlled holding device, having gripper fingers, which is positioned immediately before the leading edge vacuum holding device and which grips the leading label edge before it reaches the gluing device, and, thus, reliably retains it against lift off of the label from the cylinder at the point of glue application.

The leading edge glue application roller is equipped with sufficiently deep grooves which are aligned with the gripper fingers to allow passage of the fingers without interference.

The gripper fingers holding the leading label edges protrude past the periphery of the vacuum transfer cylinder and, thus, describe an arc that enables contact with the outside diameter of the glue transfer cylinder. This procedure ensures consistent application of a strip of glue to the leading edge of the label while the remaining label portion, especially the center part, is held tightly against the periphery of the vacuum cylinder and thus receives no glue.

The leading label edge vacuum holding device can also be incorporated in the vacuum cylinder as a fixed protrusion having vacuum ports. This, however, requires that the gripper fingers can be retracted into the vacuum cylinder before label transfer to the container to avoid collision. It is also possible to make the vacuum device for the leading label edge radially movable, similar to a slide, to transfer the label to the container after the gripper fingers are lifted off the label. This does not require a complete retraction of the gripper fingers past the radius of the first vacuum device. The second vacuum device which serves to support the trailing edge, as viewed in the direction of its rotation, is radially mounted in the vacuum transfer cylinder. This second vacuum device remains inside the periphery of the vacuum transfer cylinder during its rotation and moves radially only when it passes the second glue roller which applies the glue strip to the trailing edge of the label segment. Preferably, the surface of the second vacuum device remains flush against the periphery of the vacuum cylinder before and after glue transfer.

The glue roller for application of the glue strip to the trailing edge of the label is, in relation to the leading edge glue applicator roller, mounted further away from the periphery of the vacuum cylinder to allow passage of the leading edge vacuum device without previous retraction into the periphery of the vacuum cylinder. It does not matter if the trailing edge glue application roller, as viewed in the rotational direction of the vacuum cylinder, is mounted before or behind the leading edge glue application roller as long as the radial movement of the trailing edge vacuum device is controlled in accordance with this arrangement.

The second glue cylinder has, due to its larger radial distance to the radius of the first vacuum device, a surface without grooves to enable application of a continuous uninterrupted strip of glue to the trailing edge of the label. This is an important feature since it improves the appearance of the finished label container especially when thin full wrap label film material is used.

How the foregoing features of the invention are implemented will be evident in the more detailed description of the invention which will now be set forth in reference to the drawings.

DESCRIPTION OF A PREFERRED EMBODIMENT

Figure 1:
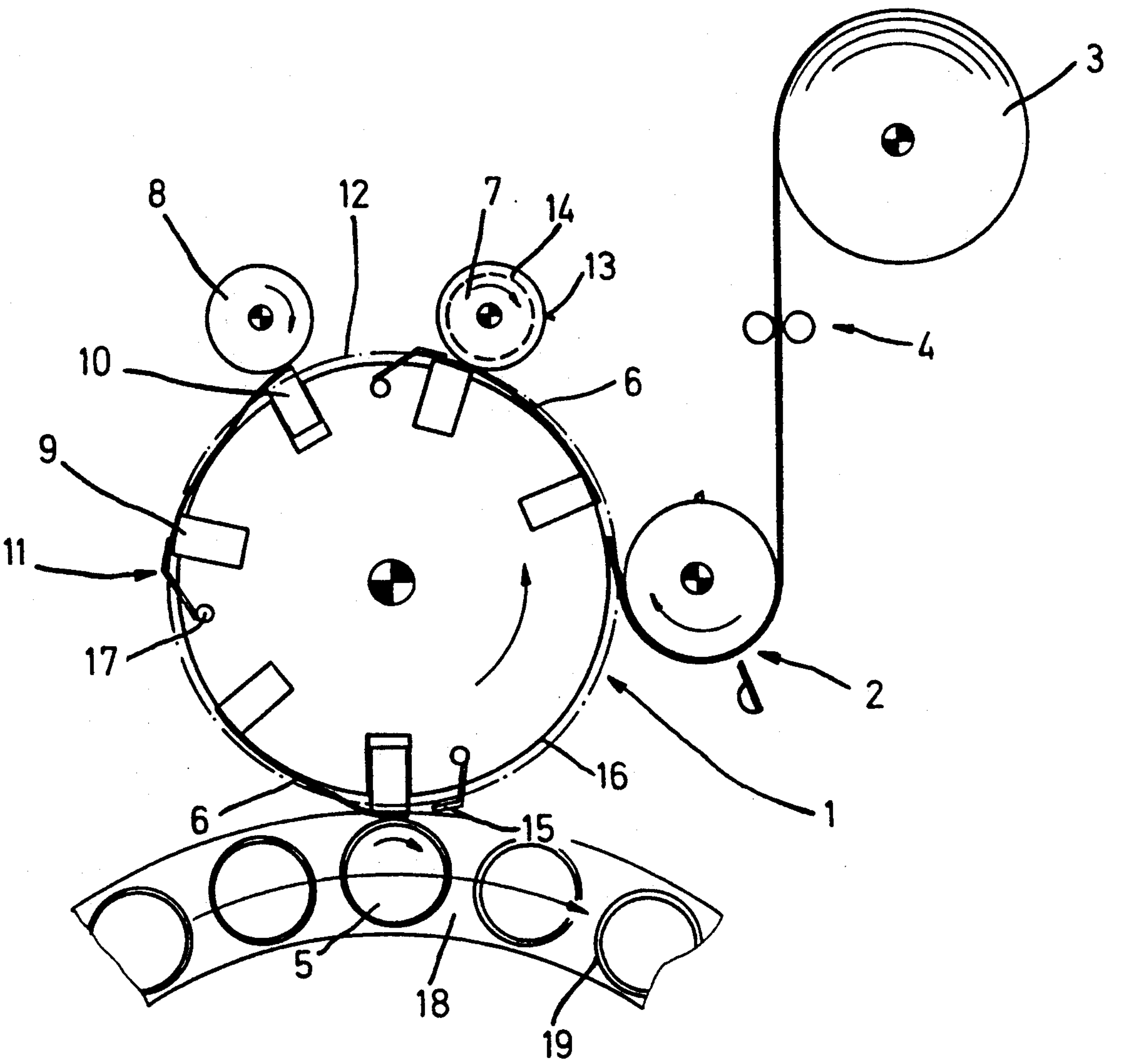
FIG. 1 is a schematic top plan view of a labeling machine which incorporates the new labeling device.

The vacuum transfer cylinder 1 shown in FIG. 1 is an important feature of the invention and is synchronously driven with the partially illustrated rotary container conveyance 18 of a labeling machine. The container conveyor 18 comprises a rotary table equipped with rotating disks or platforms 19 which serve to support containers 5 which are to be labeled.

Mounted before the vacuum transfer cylinder 1 is a cutting device 2 which is continuously supplied with label material from the label or web reel 3 by way of a web drive unit 4. Cutting device 2 has an orbiting blade 50 cooperating with a stationary blade 51. The vacuum transfer cylinder 1 comprises at least one vacuum device 9 which holds the leading edge of the previously cut label 6 and a second vacuum device 10 to fix and support the trailing edge of the label. Both vacuum devices 9 and 10 are equipped with several vacuum orifices 31. The design of the vacuum orifices 31 is depicted in FIGS. 2 and 3 and will be described in greater detail later.

Both vacuum devices 9 and 10 are mounted within the vacuum transfer cylinder and are designed as radially movable slides.

The surface of the first vacuum device 9 protrudes past the periphery 16 of the vacuum transfer cylinder 1 by several millimeters and describes a radius 12, shown in phantom lines in FIG. 1, during its rotation. The second vacuum device 10 is positioned radially within the radius 12 and approximately flush with the periphery 16 of vacuum cylinder 1. Mounted in front of vacuum device 9 is, as viewed in the direction of rotation, a mechanical gripper device 11 for holding the leading edge of the label. The first glue roller 7 is equipped with concentric grooves 14 and is mounted along the periphery of vacuum cylinder 1 in a manner such that the outer surface 13 of glue roller 7 contacts radius 12 of the first vacuum device 9.

Figure 2:
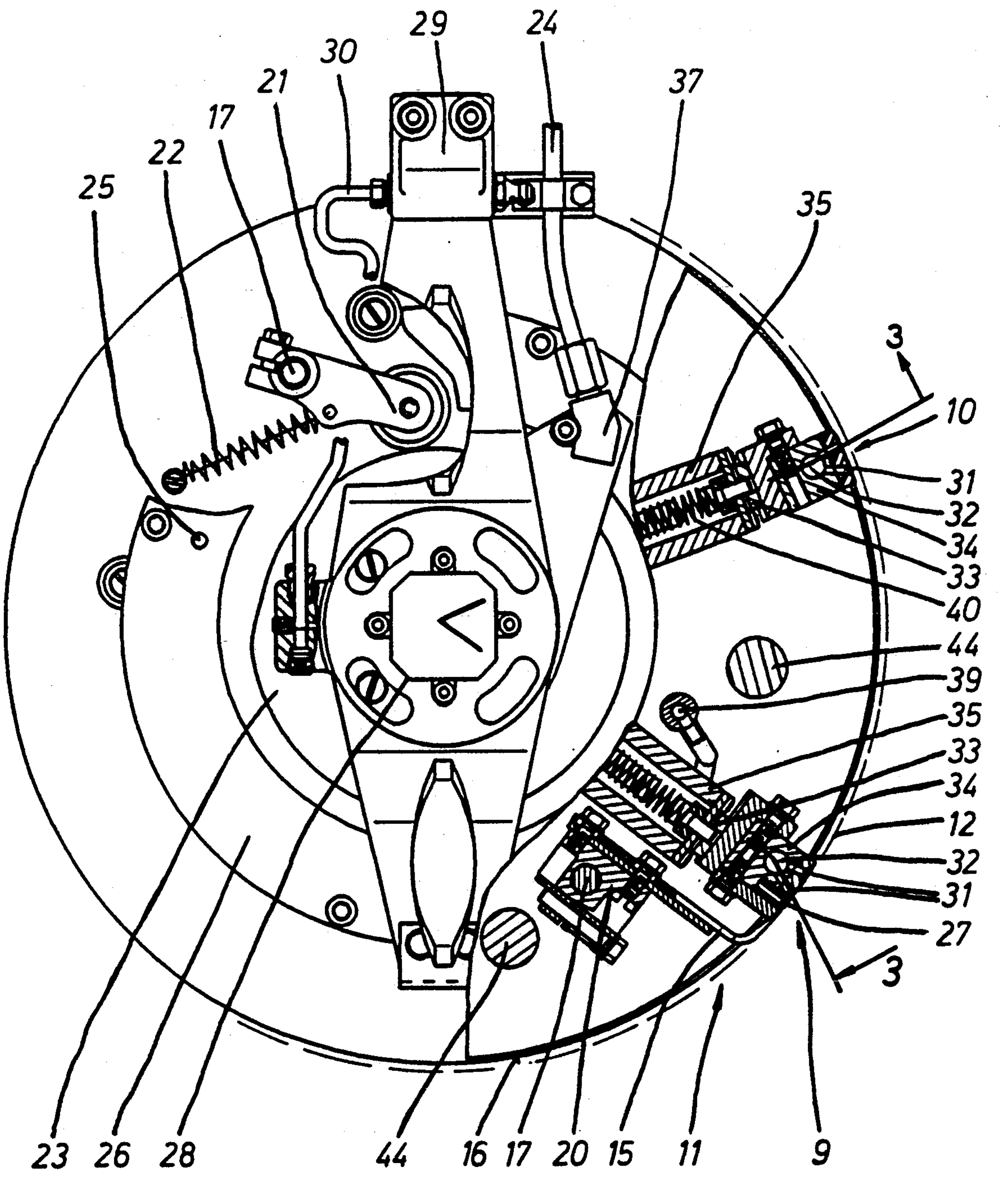
FIG. 2 is a top plan view of a vacuum transfer cylinder.
Figure 3:
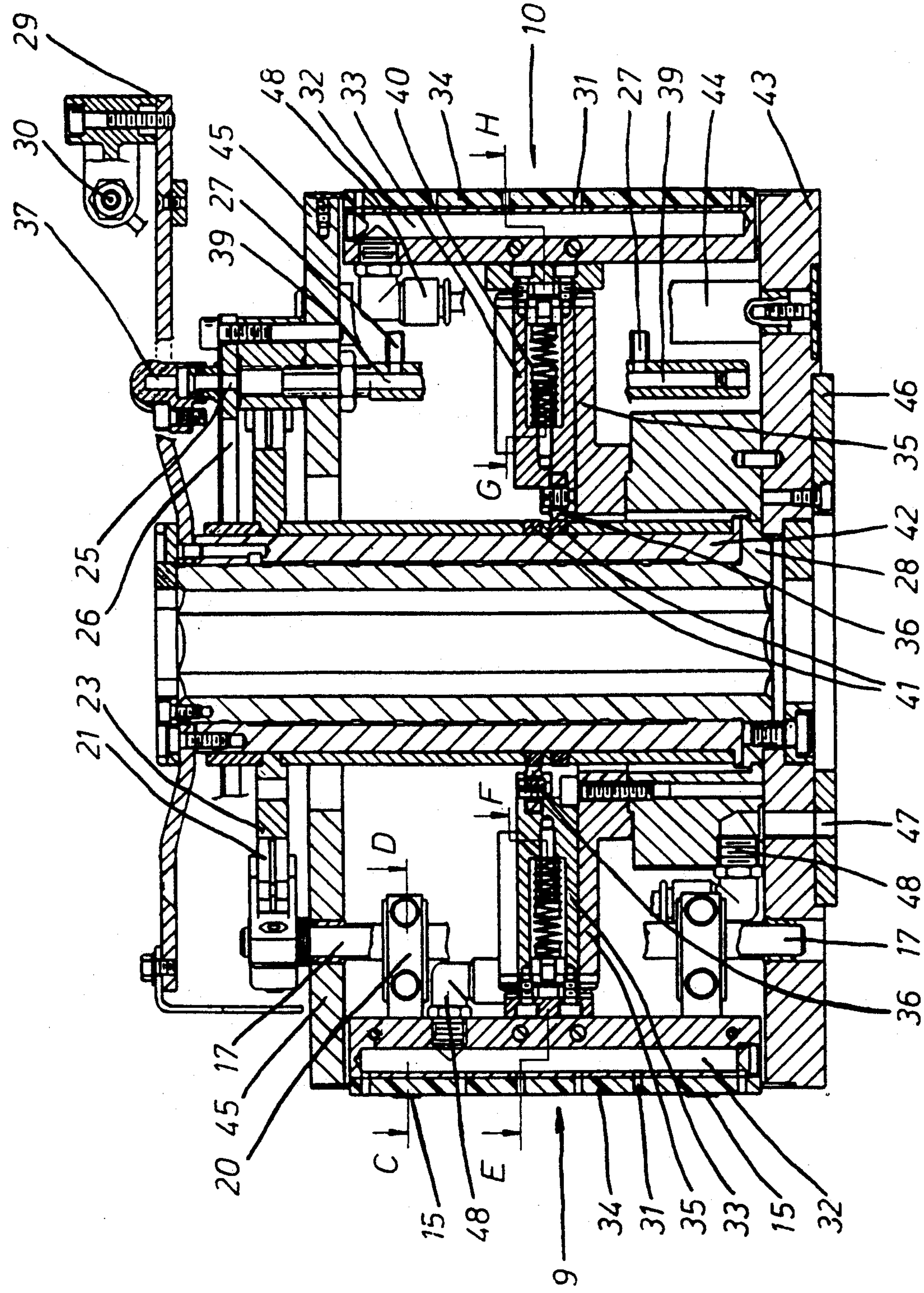
FIG. 3 is a sectional view through the vacuum cylinder of FIG. 2 taken on a line corresponding with 3—3 in FIG. 2.

In FIG. 2, the vacuum transfer cylinder is partially shown in a horizontal cross-section. This cross-section consists of a partial cross-section taken along the gripper device 11, along line C-D, a cross-section through the first vacuum device 9 along line E-F and finally a cross-section through the second vacuum device 10 along line G-H in FIG. 3. As is shown in FIG. 2, the surface of the vacuum device 9 protrudes several millimeters past periphery 16 of the vacuum transfer cylinder 1 and describes a radius 12, shown in dashed lines in FIG. 2, through the rotation of vacuum device 9. A second vacuum device 10 which serves to fix and support the trailing edge of the label, however, is flush with its surface in periphery 16. Both vacuum devices 9 and 10 are equipped with vacuum orifices 31 to hold the label. These orifices branch off the first and second vacuum devices 9 and 10 and extend radially to the outer surface of resilient strips 34.

The previously mentioned vacuum orifices 31 are formed in elastic, exchangeable strips 34 mounted to radially movable slides. Strip 34 of the first vacuum device 9 is further equipped with ports 27 for compressed air in the area of the leading edge of the label. The slides 33 are mounted in guide blocks 35 and are equipped with a cam follower 36 (see FIG. 3) at its inner end. A compression spring 40 provides the necessary radial force towards the center of the vacuum cylinder.

The mechanical gripper device 11 which is part of the first vacuum device 9 comprises two gripper fingers 15 mounted with spring pressure, superimposed at some distance apart, to two mounting blocks 20 which are fixed to control shaft 17. The control shaft 17 is actuated with a cam follower roller lever 21 which is held against the gripper control cam 23 with a tension spring 22. As can be seen in FIG. 2, the vacuum transfer cylinder is equipped with a torque detent 29 to which a grease line 30 and a compressed air infeed line 24 are permanently fixed.

The radially incoming compressed air supply line 24 is connected to an elbow 37 which directs the air stream axially onto a rotating air manifold 26 equipped with control ports 25. From there the compressed air is directed to the compressed air ports 27 by way of a connecting line 39, if and when a control port 25 is aligned with the opening of the elbow 37 depicted in FIG. 3.

As can be seen more easily in FIG. 3, the torque detent bracket 29 prevents the gripper control cam 23 and both slide control cams 41 from rotating. The upper slide control cam 41 controls slide 33 of the leading label edge vacuum device 9 and lower slide control cam controls the slides of the second vacuum device 10. The slide control cams 41 and the gripper control cam 23 are mounted to a pipe 42 which prevents twisting. The upper end of pipe 42 is bolted to the torque detent bracket 29.

Coaxially mounted in pipe 42 is a freely turning polygon sleeve 28 which is connected to the polygon drive shaft, not shown, of the labeling machine. A carrier plate 43 is mounted to the lower end of polygon sleeve 28 to which a guide block 35, by way of an only partially visible spacer bolt, a carrier ring 45 is mounted. Bolted to the upper surface of carrier ring 45 is the compressed air control disk 26. Fixed to the lower surface of carrier plate 43 is a vacuum distributor disk 46 which is equipped with control ports and rests on the flange, not shown, of the labeling apparatus during operation. This flange is connected to a vacuum source, not shown, and is on the upper surface facing the vacuum distributor disk 46 which is equipped with radially shaped, segmented control slots, not shown, whose radius corresponds with the distance of the vacuum control ports 47 from the center axis of the polygon sleeve 28. The arcuate length and position of the slots is determined by the required vacuum duration. Each of the first and second vacuum devices 9 and 10 is, by way of its own supply line 48, connected with one of the control ports 47 which supplies vacuum ports 32 and vacuum orifices 31 located in vacuum strips 34.

Operation of the device is as follows: Feed rollers 4, driven synchronously with the labeler, unwind and advance the printed label material properly positioned from the reel 3 to the cutting device 2 which has a rotating blade 50 cooperating with a fixed blade 51. Located immediately behind the rotating cutting device 2 is the vacuum transfer cylinder 1 to which the leading edge of the label material is held by vacuum with some slippage. As soon as the first vacuum device 9 reaches the leading label edge, separation by the cutting unit takes place and the label is transferred to vacuum cylinder 1 without further slippage. Before the first glue roller 7 is reached, the gripper fingers 15 of the gripper device 11, which are controlled by the cam 23 acting on follower lever of control shaft 17, are placed onto the leading label edge and secure the label to the surface of the vacuum device 9. The gripper fingers 15, mounted to the control shaft 17, are aligned with horizontal concentric grooves 14 in the surface 13 of the glue roller 7 to prevent any glue touching the fingers during glue application to the leading edge of the label. The remaining label material 6 trailing the vacuum device 9, is smoothly drawn by vacuum against the periphery 16 of vacuum transfer cylinder 1 and does not receive any glue. During the continuing rotation of the vacuum transfer cylinder 1, the leading edge of the label 6 together with the vacuum device 9 and its gripper device 11, passes the glue cylinder 8 without retraction of vacuum device 9. The second vacuum device 10, however, is extended radially to the outside of vacuum cylinder 1 by way of upper slide control cam 41 before device 10 reaches glue cylinder 8 and thus enables the trailing edge of the label to make contact with glue cylinder 8 and receive a continuous vertical strip of glue.

The vacuum device 10 is then retracted again into the periphery 16 of vacuum transfer cylinder 1. Before the label 6 is transferred to the container 5, the gripper fingers 15 controlled by the control cam 23 and shaft 17 are pivoted away from the container in the direction of travel to release the label 6 for transfer to container 5. In order to secure the leading edge of the label to the container side, the vacuum device 9 can be extended radially past radius 12 by way of the slide control cam and then retracted. At the point of label transfer, the vacuum supply of the vacuum device 9 is interrupted and replaced by a compressed air blast from the air ports 27 which blows the leading label edge onto the container. In order to obtain higher operating speeds, the vacuum transfer cylinder 1 can be equipped with a series of first and second vacuum devices 9 and 10 to accommodate several labels around its perimeter.

I claim:

1. A device for applying a label to a series of moving containers comprising:

a label transport cylinder arranged for being driven rotationally about its axis, first and second devices for holding a label at its ends mounted in circumferentially spaced apart relationship about the periphery of said transport cylinder and means for moving said devices radially outwardly a small amount relative to said periphery of said transport cylinder and for retracting said devices inwardly, said devices having radially outwardly presented surfaces in which there are orifices, means for communicating said orifices selectively with vacuum or pressurized air sources, gripper means including swingable gripper fingers mounted to said first device and swinging means for swinging said fingers in a direction to seize the leading end of a label which is fed onto said cylinder while vacuum is applied to said orifices of the first device, said orifices of said second device communicating with said vacuum source to attract and hold the trailing end of said label while its leading end is held and said label is being transported in a circular path on said cylinder, a first glue application roller adjacent said cylinder and rotatable about an axis which is parallel to the axis of said cylinder, said roller having annular grooves into which said fingers enter and said outwardly presented surface of said first device extending radially outwardly from said periphery of the cylinder by a small distance as the gripped leading end of said label is put in contact with said first glue roller to apply a strip of glue to said leading end without applying glue to the remainder of the label, a second glue roller adjacent said transport cylinder periphery and spaced in the direction of rotation of the transport cylinder from said first glue roller which is rotatable about an axis parallel to the axis of the cylinder, the periphery of said second glue roller being spaced from the periphery of said cylinder by a distance greater than said small distance to provide for said fingers on the leading end of the label passing the second roller with clearance, said second device being extended radially sufficiently when passing said second glue roller to contact said trailing end of the label and apply a strip of glue thereto, said means for swinging said fingers operating to retract said fingers and release said leading end of said label when said end is proximate to a container for the glue on the leading end to adhere to said spinning container and cause the label to wrap around the container.

2. The device according to claim 1 wherein said orifices of said first device for holding the leading end of the label are placed in communication with said source of pressurized air after said fingers swing to release said leading end for the air to blow said end into contact with the container.

* * * * *